United States Patent
Classen

(10) Patent No.: US 8,695,425 B2
(45) Date of Patent: Apr. 15, 2014

(54) YAW RATE SENSOR

(75) Inventor: Johannes Classen, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 248 days.

(21) Appl. No.: 13/138,102

(22) PCT Filed: Dec. 3, 2009

(86) PCT No.: PCT/EP2009/066302
§ 371 (c)(1),
(2), (4) Date: Sep. 27, 2011

(87) PCT Pub. No.: WO2010/083918
PCT Pub. Date: Jul. 29, 2010

(65) Prior Publication Data
US 2012/0006115 A1    Jan. 12, 2012

(30) Foreign Application Priority Data
Jan. 21, 2009    (DE) .......................... 10 2009 000 345

(51) Int. Cl.
*G01C 19/56*    (2012.01)

(52) U.S. Cl.
USPC .................................... 73/504.12; 73/504.14

(58) Field of Classification Search
USPC .............. 73/504.12, 504.14, 504.16, 504.02, 73/504.04
See application file for complete search history.

(56) References Cited

U.S. PATENT DOCUMENTS

| | | | |
|---|---|---|---|
| 5,783,749 A | 7/1998 | Lee et al. | |
| 6,349,597 B1 | 2/2002 | Folkmer et al. | |
| 7,036,373 B2 * | 5/2006 | Johnson et al. | 73/504.14 |
| 7,444,868 B2 * | 11/2008 | Johnson | 73/504.12 |
| 8,011,244 B2 * | 9/2011 | Diem | 73/504.12 |
| 8,187,902 B2 * | 5/2012 | Weinberg et al. | 438/50 |
| 2004/0154397 A1 | 8/2004 | Platt et al. | |
| 2005/0081631 A1 * | 4/2005 | Weinberg et al. | 73/504.16 |
| 2008/0168838 A1 | 7/2008 | Martin et al. | |

FOREIGN PATENT DOCUMENTS

| | | |
|---|---|---|
| JP | 7-120266 | 5/1995 |
| JP | 11-132770 | 5/1999 |
| JP | 2001-21360 | 1/2001 |
| JP | 2004-518971 | 6/2004 |
| JP | 2005-249454 | 9/2005 |
| JP | 2008-8884 | 1/2008 |

* cited by examiner

*Primary Examiner* — Helen Kwok
(74) *Attorney, Agent, or Firm* — Kenyon & Kenyon LLP

(57) ABSTRACT

A yaw rate sensor includes a substrate having a substrate surface, a first movable element, which is disposed above the substrate surface and has a drive frame and a first detection mass, a first electrode, which is disposed at a distance underneath the first detection mass and connected to the substrate surface, and a second electrode which is disposed at a distance above the first detection mass and connected to the substrate surface. The drive frame is connected to the substrate via at least one drive spring, the detection mass is connected to the drive frame via at least one detection spring, and the first movable element is excitable to a drive oscillation parallel to the substrate surface, and the first detection mass is deflectable perpendicular to the substrate surface.

14 Claims, 7 Drawing Sheets

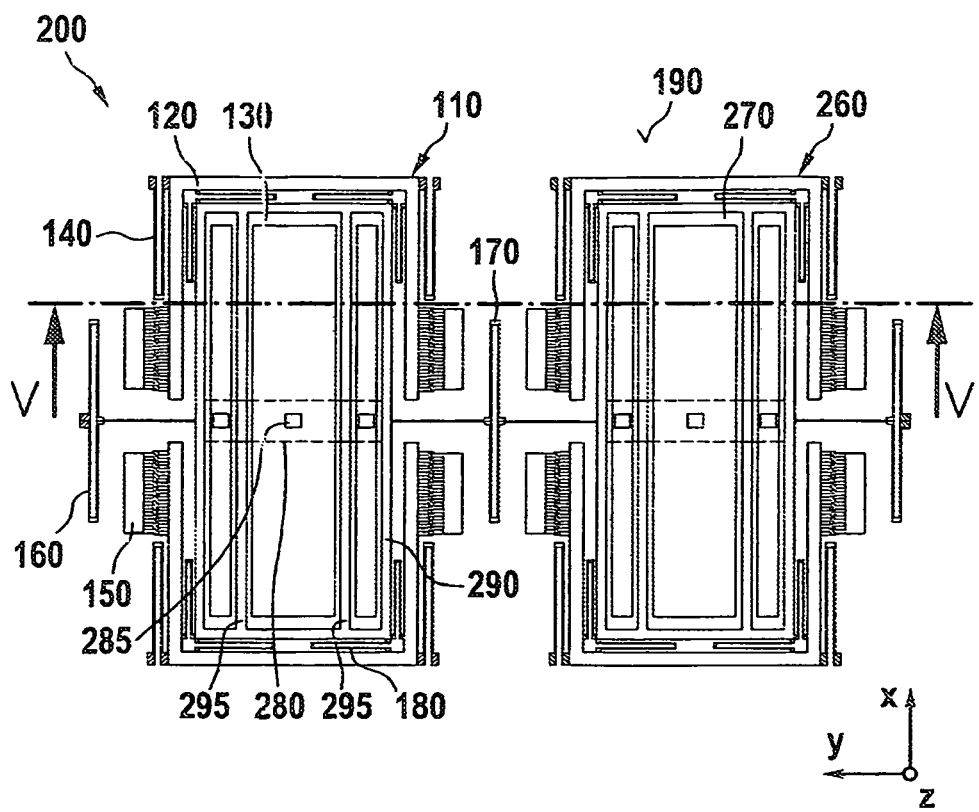
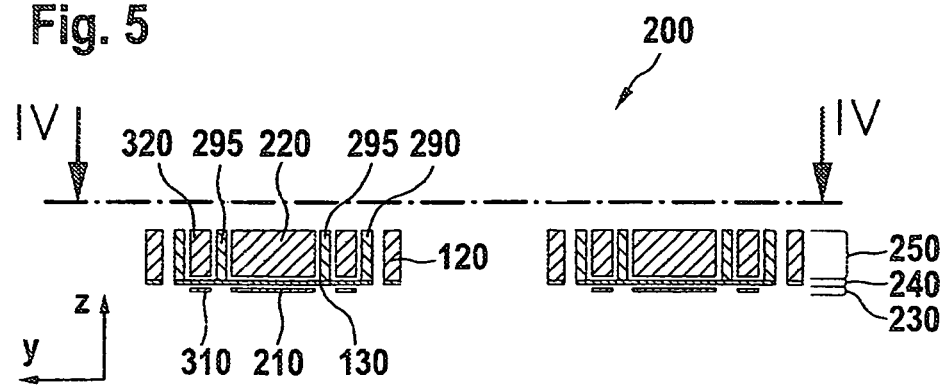

YAW RATE SENSOR

BACKGROUND OF THE INVENTION

1. Field of the Invention

The present invention relates to a yaw rate sensor.

2. Description of Related Art

Micromechanical yaw rate sensors are known from the related art. Such yaw rate sensors are used in different application fields; in the automotive field, for example, they are employed for ESP systems, for roll-over sensing, or for navigation purposes.

Parts of the sensor structure in these yaw rate sensors are actively induced to a drive oscillation along a first direction, which is oriented parallel to a substrate surface, for example. When an outer yaw rate occurs about a detection axis that is oriented perpendicular to the first direction and also parallel to the substrate surface, for example, Coriolis forces come to bear on the oscillating parts of the sensor structure. These Coriolis forces, which may vary periodically with the frequency of the drive oscillation, cause periodic deflections of parts of the sensor structure along a third direction, which is oriented perpendicular to the drive direction and detection axis. For example, the third direction may be oriented perpendicular to the substrate surface. Mounted on the sensor structure are detection means which detect the deflection of the parts of the sensor structure in a capacitive manner via electrodes.

Known yaw rate sensors have only one detection electrode per movable sensor structure, which is fixedly connected to the substrate. This is disadvantageous insofar as the useful capacity between detection electrode and movable sensor structure is low. Furthermore, it precludes a differential detection of the deflection of the movable sensor element using only one stationary detection electrode per movable sensor element.

U.S. Patent Application Publication No. 2008/0168838 A1 describes a yaw rate sensor having a fully differential electrode system, in which a suitably patterned and electrically contacted area in a sensor cap is used as upper counter-electrode. However, despite all manufacturing tolerances, this approach makes it very difficult to adjust the clearance between the movable sensor structure and upper fixed electrode such that it is precisely as large as the clearance between the movable sensor structure and the lower fixed electrode.

Also known from the related art are yaw rate sensors having two coupled movable sensor substructures, which are excitable to a coupled drive oscillation producing an anti-parallel deflection of the movable substructures. Because of the anti-parallel drive oscillations of the two substructures, a yaw rate acting on the yaw rate sensor leads to an anti-parallel deflection of the two substructures. An evaluation of the capacity changes between the movable substructures and the associated fixed electrodes enables a differential detection of the effective yaw rate. One disadvantage of these known yaw rate sensors is their vibration sensitivity and the sensitivity to the excitation of a parallel mode that is difficult to suppress.

BRIEF SUMMARY OF THE INVENTION

It is the object of the present invention to provide an improved yaw rate sensor.

The core idea of the present invention is the use of an additional micromechanical functional plane in the sensor core, which is able to be patterned by surface-micromechanical processes, independently of a circuit track plane lying underneath and an additional functional plane lying on top. Because of the three-layer system, it is possible to realize a fully differential electrode system for each sensor structure of the yaw rate sensor in a simple manner.

A yaw rate sensor according to the present invention includes a substrate having a substrate surface, a first movable element disposed above the substrate surface and having a drive frame and a first detection mass, a first electrode which is disposed at a distance underneath the first detection mass and connected to the substrate surface, and a second electrode which is disposed at a distance above the first detection mass and connected to the substrate surface. The drive frame is connected to the substrate via at least one drive spring, the detection mass is connected to the drive frame via at least one detection spring, the first movable element is excitable to a drive oscillation parallel to the substrate surface, and the first detection mass is deflectable perpendicular to the substrate surface.

The yaw rate sensor according to the present invention advantageously allows a differential evaluation of the deflection of the movable element perpendicular to the substrate surface. The bilateral electrode system allows a fully resonant operation of the yaw rate sensor, in which the frequencies of drive oscillation and detection oscillation are adjusted to one another by applying electrostatic feed-forward voltages to the electrodes, without this affecting the clearances between the movable element and the electrodes. This prevents contact between the movable element and the electrodes (snapping). Another advantage of the yaw rate sensor according to the present invention is its reduced vibration susceptibility.

In one preferred specific embodiment, a circuit track plane, a first functional plane and a second functional plane are layered on top of each other, the circuit track plane being connected to the substrate surface. The drive frame is disposed in the first functional plane and the second functional plane, the first detection mass is at least partially disposed in the first functional plane, the first electrode is disposed in the circuit track plane, and the second electrode is disposed in the second functional plane. This advantageously makes it possible to realize a bilateral electrode system.

In one especially preferred specific embodiment, the yaw rate sensor has a second movable element having a second detection mass, the first and the second detection mass being connected to one another via a coupling spring, and the first and the second movable element being excitable to a coupled drive oscillation parallel to the substrate surface. This advantageously increases the precision and the immunity to interference of the yaw rate sensor.

In one further development, the first and the second movable element are excitable to a coupled drive oscillation producing an anti-parallel deflection of the first and the second movable element. This advantageously makes it possible to distinguish an anti-parallel deflection of the detection mass perpendicular to the substrate surface due to a yaw rate, from a parallel deflection of the detection masses perpendicular to the substrate surface and caused by a linear acceleration.

It is useful if the first movable element has a stabilizing frame, which is disposed in the second functional plane at least partially. Preferably, the first movable element is implemented in the form of a trough and has a bottom that is disposed in the first functional plane, and an edge, formed by the stabilizing frame, in the first functional plane and the second functional plane. This ensures sufficient stability of the first movable element.

For practical purposes, the first movable element has at least one opening, the second electrode being connected to the substrate surface at the affixation point through the opening.

At least one drive comb structure is preferably provided in order to excite the first movable element to the drive oscillation. Furthermore, the first movable element is preferably connected to the substrate surface via at least one external spring.

It is useful if the first functional plane and the second functional plane are made of conductive silicon.

In one further development of the present invention, at least one additional electrode is disposed underneath and/or above the first detection mass. This further electrode advantageously allows electrostatic positive feedback of the first detection mass in order to ensure that the frequency of the drive oscillation agrees with the frequency of the deflection of the movable element perpendicular to the substrate surface. As an alternative, the further electrode may also be used for quadrature compensation. In addition, the further electrode may be used for a closed-loop position control of the first detection mass.

In one further development, the yaw rate sensor is connected to an evaluation circuit designed to infer a deflection of the first detection mass perpendicular to the substrate surface from a change in the capacities between the first detection mass and the first and second electrodes, and to infer from the deflection of the first detection mass a yaw rate acting on the yaw rate sensor. This advantageously allows an automatic measurement of a yaw rate.

The present invention will now be described in greater detail in the following text with reference to the attached figures. Uniform reference numerals are used for parts that are the same or act the same.

BRIEF DESCRIPTION OF THE DRAWINGS

FIG. 4 shows a second specific development of a yaw rate sensor.

FIG. 5 shows a section through the second specific embodiment of the yaw rate sensor.

DETAILED DESCRIPTION OF THE INVENTION

Figure 1:
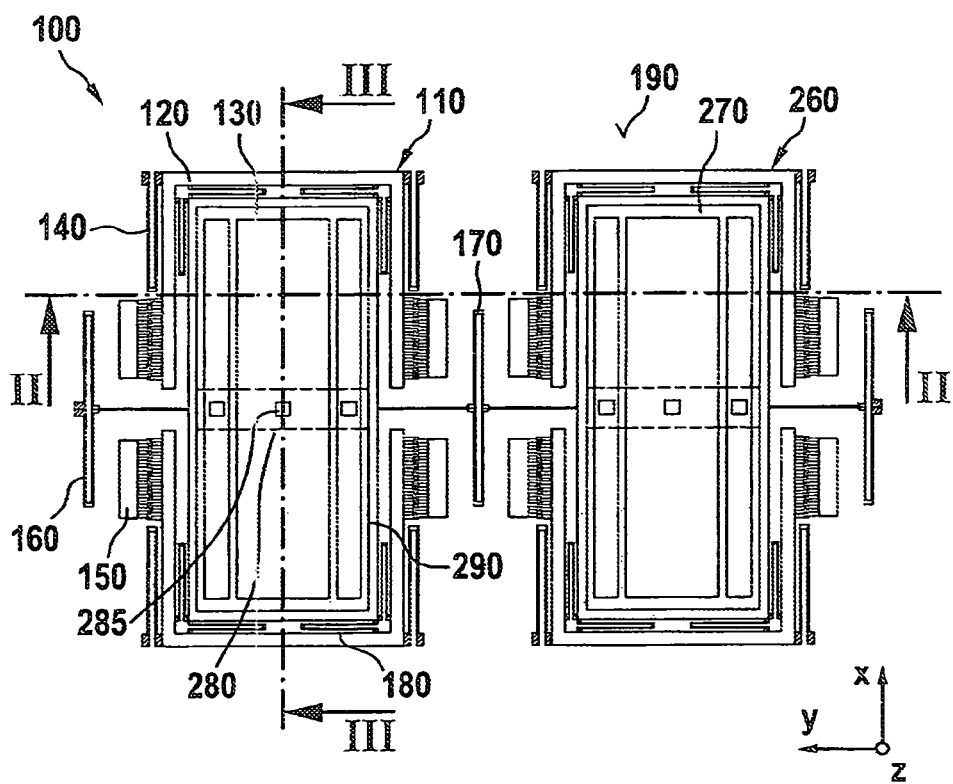
FIG. 1 shows a schematic plan view of a first specific embodiment of a yaw rate sensor.

FIG. 1 shows in a schematized illustration a plan view of a first specific development of a yaw rate sensor 100. Yaw rate sensor 100 is made from a substrate and disposed above a substrate surface 190 in the x-y plane, which lies in the paper plane in the illustration of FIG. 1. The substrate may be a silicon substrate, for example. Yaw rate sensor 100 includes a first movable element 110 and a second movable element 260, first movable element 110 and second movable element 260 having a symmetrical design with respect to each other and being disposed next to each other in the y-direction. First movable element 110 will be described in the following text. The description analogously applies to second movable element 260.

First movable element 110 has a drive frame 120. In the specific development of FIG. 1, drive frame 120 has two U-shaped sections whose openings face each other and thereby largely enclose a surface portion that lies in the x-y plane.

A first detection mass 130 is situated in the surface portion enclosed by drive frame 120.

Drive frame 120 is connected to substrate surface 190 via four drive springs 140. One of drive springs 140 in each case is disposed at each side piece of the two U-shaped sections of drive frame 120. Each drive spring 140 is made up of a U-shaped substrate bar, whose one end is connected to substrate surface 190 and whose other end is connected to drive frame 120. Each drive spring 140 is elastic in the y-direction, but largely inelastic in the x- and z-directions. Furthermore, drive frame 120 is connected to four drive-comb structures 150. Situated at each side piece of the two U-shaped parts of drive frame 120 is a drive-comb structure 150. Each drive-comb structure 150 is made up of a section that is connected to substrate surface 190 and has a series of parallel, comb-type teeth facing drive frame 120, and a section that is connected to drive frame 120 and has a series of parallel, comb-type teeth which are in engagement with the teeth of the section of drive-comb structure 150 that is connected to substrate surface 190. By applying suitable voltages, the four drive-comb structures 150 make it possible to induce drive frame 120 to an oscillation in the direction of the y-axis. In the process, drive-comb structures 150 produce deflecting forces that reset drive springs 140. It is also possible to provide more or fewer than four drive springs 140 and drive-comb structures 150 per movable element 110, 260.

First detection mass 130 is connected to drive frame 120 via a total of eight detection springs 180. A separate detection spring 180 is disposed at both ends of all four outer edges of first detection mass 130. Each detection spring 180 is made up of a U-shaped substrate bar, whose one end is connected to drive frame 120 and whose other end is connected to first detection mass 130. Together, detection springs 180 allow a deflection of first detection mass 130 with respect to drive frame 120 in the z-direction, while a deflection of first detection mass 130 with respect to drive frame 120 in the x- and y-directions is essentially prevented. A drive movement of drive frame 120 in the y-direction is thereby transmitted to first detection mass 130.

Second movable element 260 has a second detection mass 270. First detection mass 130 and second detection mass 270 are interconnected via a coupling spring 170. Coupling spring 170 is made up of a rectangular ring, elongated in the x-direction, from a substrate bar which is connected to first and second detection mass 130, 260 via two further substrate bars. Coupling spring 170 has well-defined elasticity in the y- and in the z-direction, while it is rigid in the x-direction. This causes coupling of the oscillations of detection masses 130, 270 in the y- and z-direction.

In addition, via an external spring 160, first detection mass 130 is connected to substrate surface 190 on the side facing away from second detection mass 270. External spring 160 is formed by a substrate bar which defines the outer edges of an elongated rectangle that is oriented in the x-direction and connected to first detection mass 130 via a segment. External spring 160 has a well-defined elasticity in the y- and in the z-directions, while it is essentially rigid in the x-direction. Via an additional external spring on the side facing away from first detection mass 130, second detection mass 270 is also connected to substrate surface 190. In one alternative specific embodiment, external springs 160 may be omitted.

Figure 2:
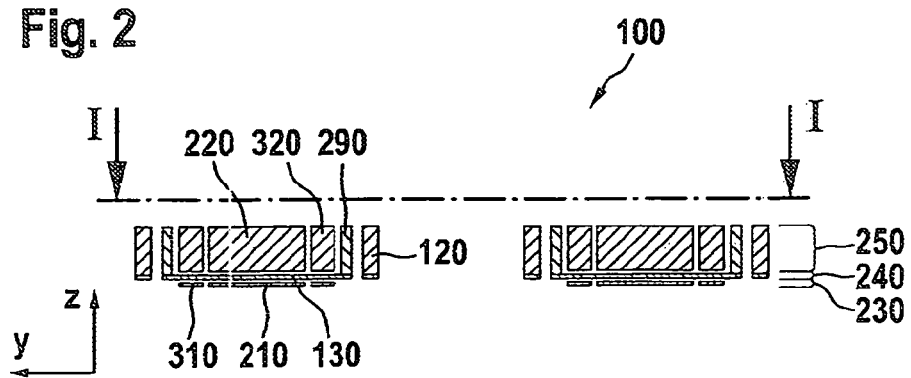
FIG. 2 shows a first section through the first specific embodiment of the yaw rate sensor.
Figure 3:
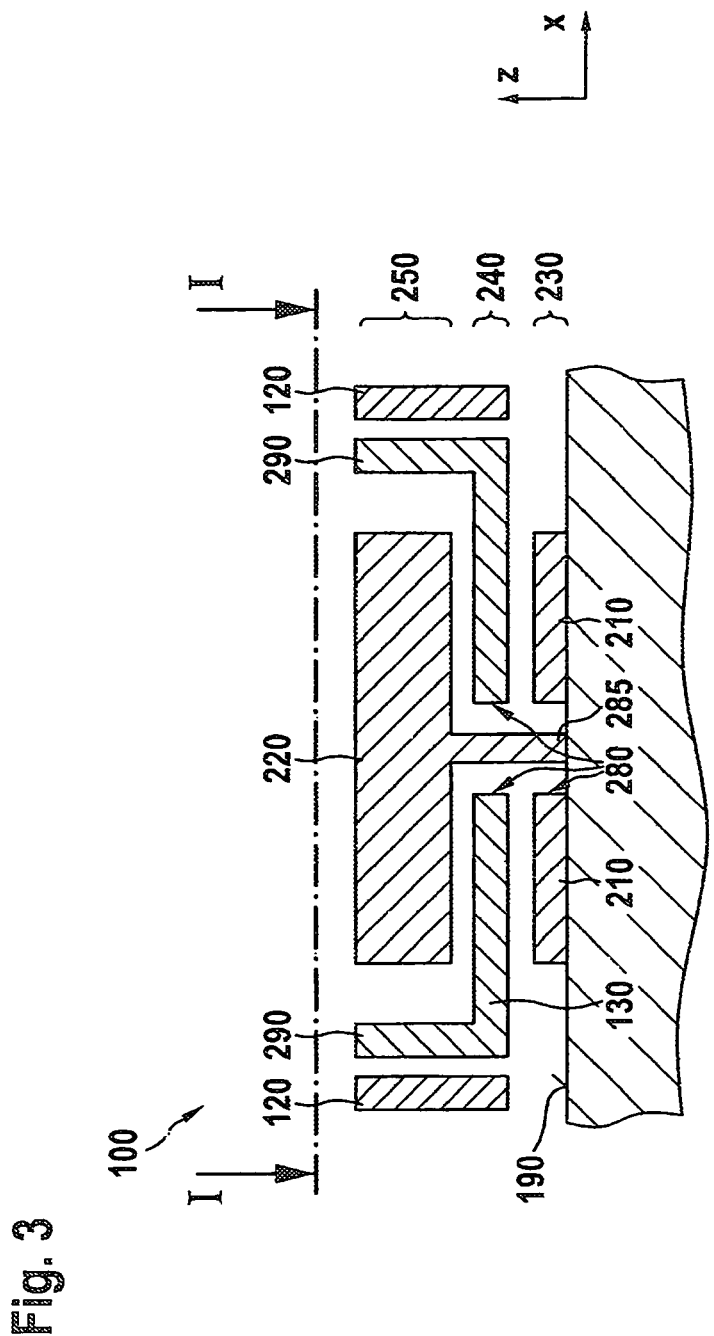
FIG. 3 shows a second section through the first specific embodiment of the yaw rate sensor.

FIG. 2 schematically illustrates a section through yaw rate sensor 100 of FIG. 1, the section being parallel to the y-z plane. FIG. 3 schematically illustrates a section through yaw rate sensor 100 of FIG. 1 that runs parallel to the x-z plane. From FIGS. 2 and 3 it can be gathered that yaw rate sensor 100 is made up of three layers that lie on top of each other in the z-direction. Situated at the bottom on or in substrate surface 190 is a circuit track plane 230, which may be made of buried polysilicon, for example. Disposed above it is a first functional plane 240, which may have a thickness of 2 μm, for instance, and consist of epitaxially grown conductive silicon. Situated on top is a second functional plane 250 possibly having a thickness of 10 μm or 20 μm, for instance, and made of epitaxially grown conductive silicon. Circuit track plane 230, first functional plane 240, and second functional plane 250 are sectionally separated from each other by empty spaces.

It becomes clear from FIGS. 2 and 3 that first detection mass 130 has a trough-shaped cross-section. A stabilizing frame 290 formed in first functional plane 240 and second functional plane 250 delimits a floor of first detection mass 130 formed by a region of first functional plane 240. Stabilizing frame 290 stabilizes first detection mass 130.

A first electrode 210 is provided in circuit track plane 230 underneath first detection mass 130. A second electrode 220 is provided in second functional plane 250, above first detection mass 130, and delimited by stabilizing frame 290 of first detection mass 130. First electrode 210 and second electrode 220 preferably have similar lateral dimensions in the x-y direction.

First electrode 210 and the floor region of first detection mass 130 lying in first functional plane 240 have an opening 280. This is illustrated in FIG. 3. In the region of opening 280, second electrode 220 is connected to substrate surface 190 via a post-shaped affixation point 285. In a section running parallel to the x-z plane, as illustrated in FIG. 3, second electrode 220 thus has a T-shaped cross-section. First electrode 210 and second electrode 220 may be electrically connected to an electronic control and evaluation system (not shown in the figures) via circuit track plane 230.

As indicated in FIG. 2, two first additional electrodes 310 are situated in the y-direction, on both sides next to first electrode 210 in circuit track plane 230, underneath first detection mass 130. Moreover, in the y-direction, two second additional electrodes 320 are disposed above first detection mass 130 on both sides next to second electrode 220 in second functional plane 250. Second additional electrodes 320 are likewise connected to substrate surface 190 in the region of opening 280.

Drive springs 140, external springs 160, coupling springs 170, and detection springs 180 are preferably formed by material from first functional plane 240 and second functional plane 250.

Using drive comb structures 150, first movable element 110 and second movable element 260 of yaw rate sensor 100 may be excited to a coupled drive excitation that produces an anti-parallel deflection of movable elements 110, 260 along the y-axis. In a yaw rate about the x-axis, Coriolis forces are acting on first detection mass 130 and second detection mass 270 and cause anti-parallel deflections of detection masses 130, 270 in the z-direction. The deflection of first detection mass 130 in the z-direction is detectable with the aid of first electrode 210 and second electrode 220. Toward this end, first electrode 210 may be connected to a first potential (CN potential), for example, and second electrode 220 may be connected to a second potential (CP potential). The deflection of first detection mass 130 in the z-direction in relation to stationary electrodes 210, 220 causes a change having opposite signs in the capacitances between first detection mass 130 and first electrode 210 and second electrode 220. This allows a fully differential measurement of the deflection of first detection mass 130. The first and second electrodes of second movable element 260 may be connected to the first and the second potential in mirrored manner to first movable element 110, for example. This also makes it possible to carry out a fully differential evaluation of a deflection of second detection mass 270. Taken together, both movable elements 110, 260 moreover allow a fully differential determination of a yaw rate acting on yaw rate sensor 100.

First further electrodes 310 and second further electrodes 320 may be used for regulating the position of detection masses 130, 270, for instance. However, there is also the option of using additional electrodes 310, 320 for the electrostatic positive feedback in order to ensure a fully resonant agreement of the frequencies of the drive oscillation and the detection oscillation of detection masses 130, 270. Because of additional electrodes 310, 320 affixed on both sides of detection masses 130, 270 in the z-direction, the electrostatic positive feedback may take place without a change in the z-position of detection masses 130, 270. This reduces the chance that a critical voltage comes about, at which the attracting electrostatic forces exceed the mechanical restoring forces, and electromechanical instability of yaw rate sensor 100 occurs. Another advantage of the bilateral electrode system is that the vibration sensitivity of yaw rate sensor 100 is considerably reduced due to the differential signal evaluation this system makes possible.

FIG. 4 shows a plan view of a yaw rate sensor 200 according to a second specific embodiment. A section through yaw rate sensor 200 parallel to the y-z plane is illustrated in FIG. 5. Yaw rate sensor 200 differs from yaw rate sensor 100 of FIGS. 1 to 3 in that first detection mass 130 has two further stabilizing cross-ties 295 running in the x-direction in second functional plane 250, in addition to stabilizing frame 290. Each stabilizing cross-tie 295 runs in a center region of trough-shaped first detection mass 130 between two opposite-lying edges of stabilizing frame 290. Stabilizing cross-ties 295 provide additional rigidity to first detection mass 130.

Figure 6:
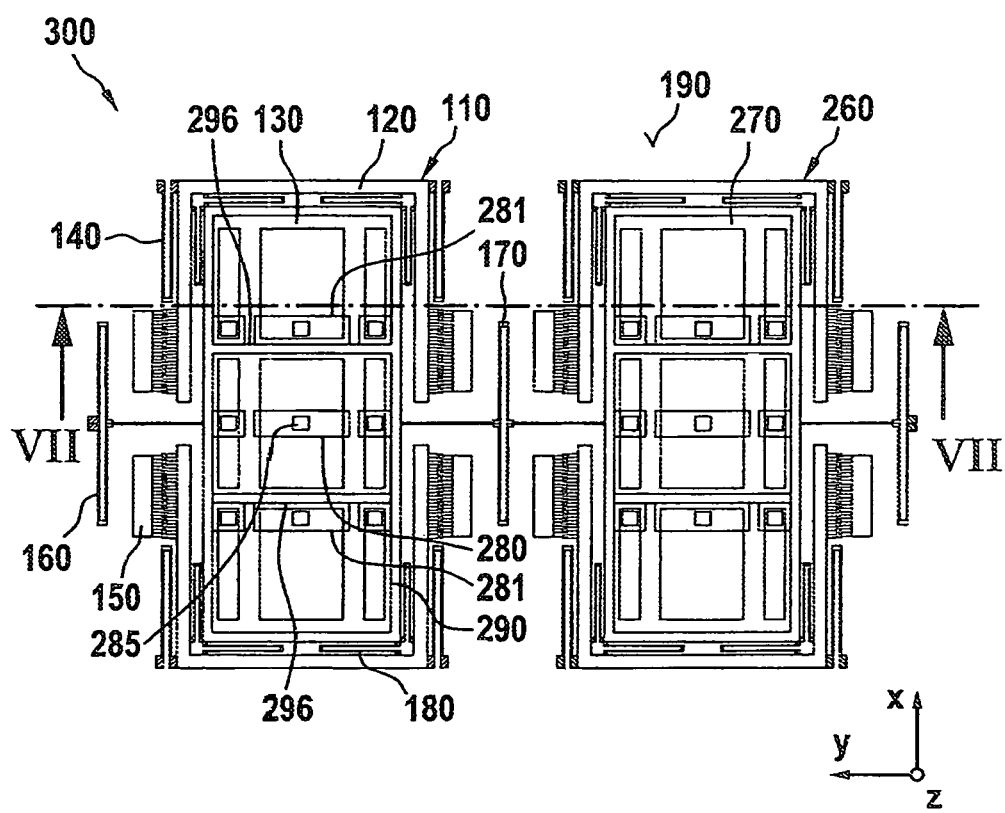
FIG. 6 shows a third specific development of a yaw rate sensor.
Figure 7:
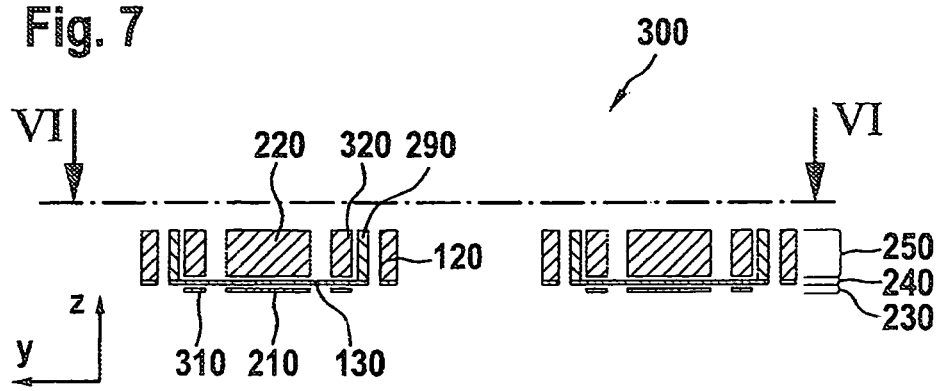
FIG. 7 shows a section through the third specific embodiment of the yaw rate sensor.

FIG. 6 shows a plan view of a yaw rate sensor 300 according to a third specific embodiment. A section through yaw rate sensor 300 parallel to the y-z plane is illustrated in FIG. 7. Yaw rate sensor 300 differs from yaw rate sensor 100 of FIGS. 1 to 3 in that first detection mass 130 has two further stabilizing cross-ties 296 extending in the y-direction in second functional plane 250, in addition to stabilizing frame 290. Stabilizing cross-ties 296 run in a center region of trough-shaped first detection mass between two opposite-lying edges of stabilizing frame 290 and provide additional stability to trough-shaped first detection mass 130. Because of stabilizing cross-ties 296 running in the y-direction, second electrode 220 disposed above first detection mass 130 is subdivided into three sections. The center section of second electrode 220 is connected to substrate surface 190 in the region of opening 280, at an affixation point 285. The two other regions of second electrode 220 are connected to substrate surface 190 via additional affixation points 285, at two additional openings 281 through first detection mass 130 and first electrode 210. This analogously applies to second additional electrodes 320 as well.

Figure 8:
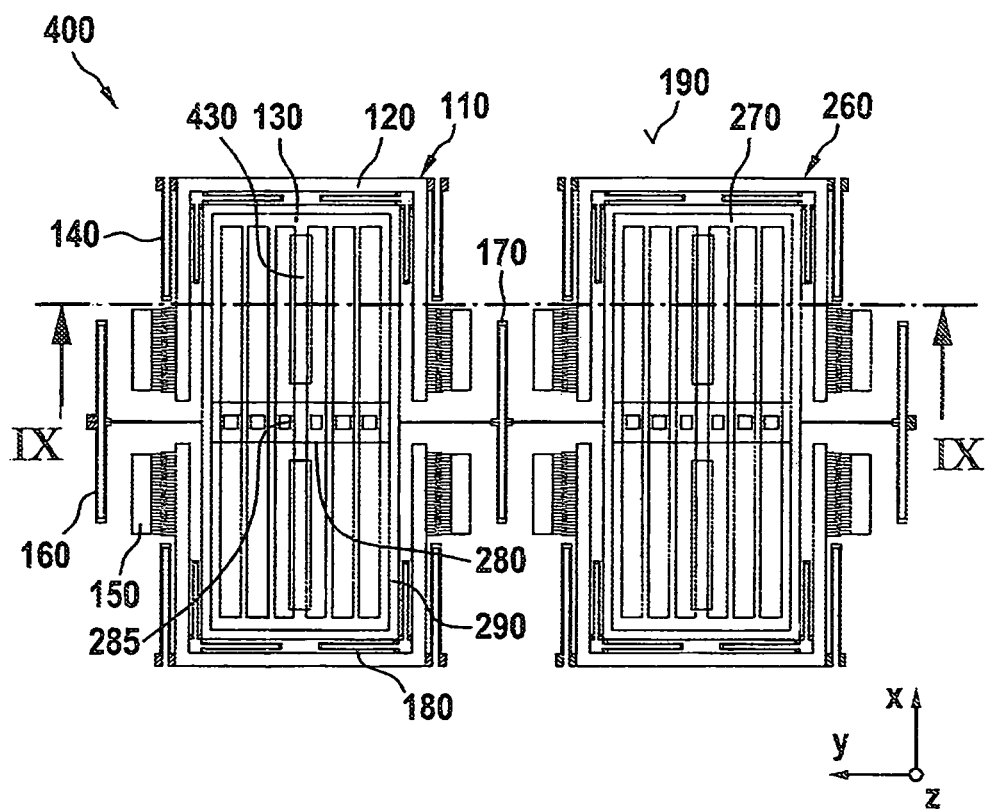
FIG. 8 shows a fourth specific development of a yaw rate sensor.
Figure 9:
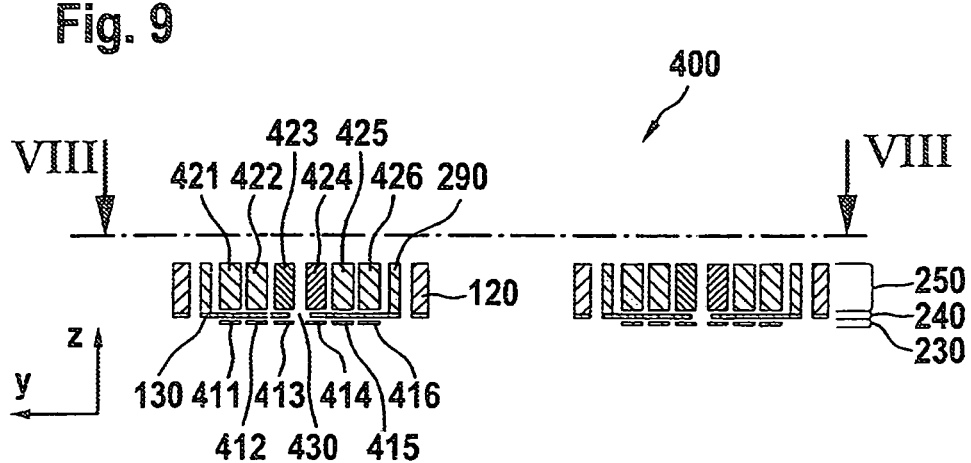
FIG. 9 shows a section through the fourth specific embodiment of the yaw rate sensor.

FIG. 8 shows a plan view of a yaw rate sensor 400 according to a fourth specific embodiment. A section through yaw rate sensor 400 parallel to the y-z plane is illustrated in FIG. 9. In contrast to yaw rate sensor 100 of FIGS. 1 through 3, first detection mass 130 of first movable element 110 of yaw rate sensor 400 has two slots 430 running in the x-direction. One slot 430 in each case is disposed in centered manner at both sides of opening 280 in the y-direction.

A further difference between yaw rate sensor 400 and yaw rate sensor 100 is that instead of first electrode 210 and first additional electrodes 310, a total of six lower electrodes 411, 412, 413, 414, 415, 416 is provided underneath first detection mass 130 of first movable element 110. Accordingly, instead of second electrode 220 and second additional electrode 320, a total of six upper electrodes 421, 422, 423, 424, 425, 426 is provided in second functional plane 250, above first detection mass 130 of first movable element 110. Lower electrodes 411-416 and upper electrodes 421-426 are implemented in the form of adjacently placed narrow strips oriented in the x-direction. The two outermost upper electrodes 421, 426 and the two outermost lower electrodes 411, 416 may be used like first and second additional electrodes 310, 320 of FIGS. 1 through 3, for regulating the position of first detection mass 130 or for the electrostatic positive feedback. Second and fifth upper electrodes 422, 425 and second and fifth lower electrodes 412, 415 are able to be used for the fully differential detection of a deflection of first detection mass 130 in the z-direction, similar to first and second electrodes 210, 220 in FIGS. 1 to 3. The two upper electrodes 423, 424 lying on the inside, and the two lower electrodes 413, 414 lying on the inside partially overlap with slots 430 in first detection mass 130. Upper electrode 423 on one side of a slot 430, and lower electrode 414 on the other side of slot 430 form a first pair. The two other inner electrodes 413, 424 correspondingly form a second pair. By applying a direct voltage to one of the pairs of electrodes, it is possible to exert a force in the z-direction on first detection mass 130, which is proportional to the deflection of first detection mass 130. It may be used for compensating quadrature forces. This means that mechanical and/or electrical crosstalk of the drive motion into the detection path is compensated. Since the crosstalk is also proportional to the deflection of first detection mass 130, the crosstalk is able to be compensated by deflection-proportional forces. The first pair of electrodes 423, 414 is used for suppressing a positive quadrature, for instance, the second pair is used for suppressing a negative quadrature.

Figure 10:
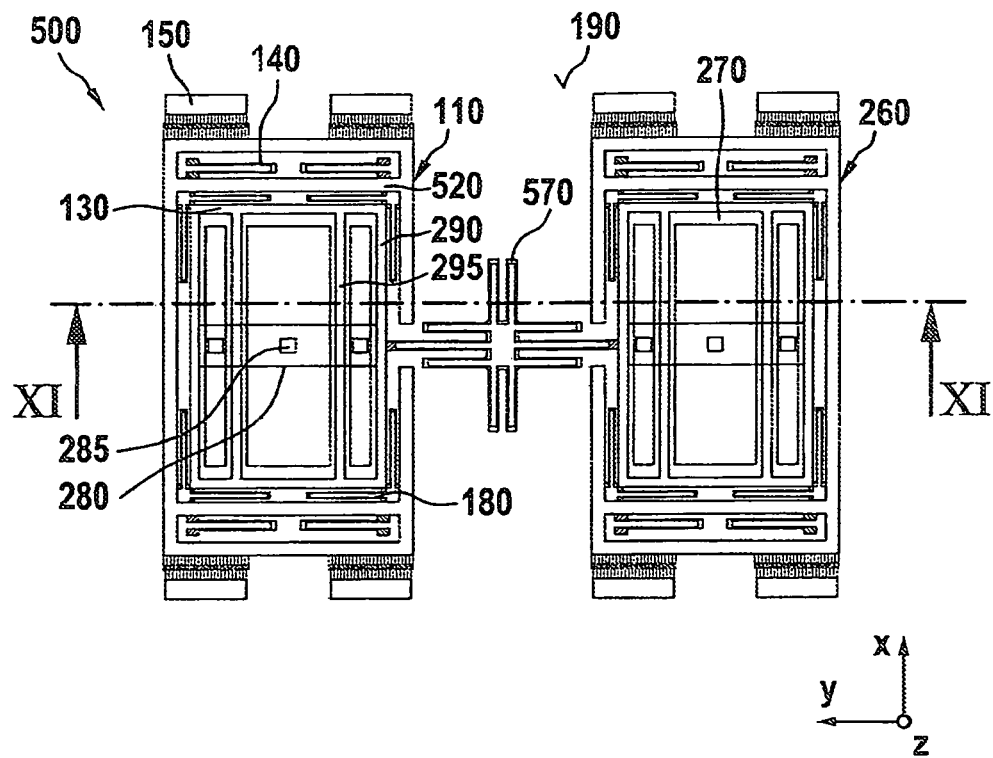
FIG. 10 shows a fifth specific development of a yaw rate sensor.
Figure 11:
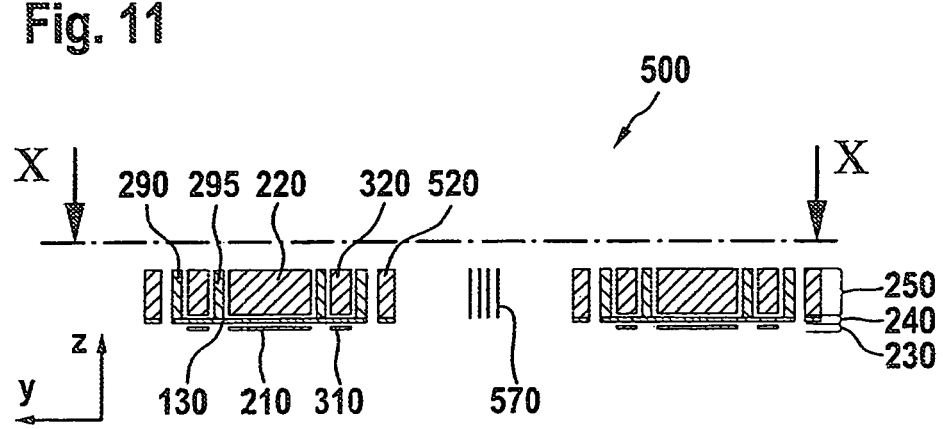
FIG. 11 shows a section through the fifth specific embodiment of the yaw rate sensor.

FIG. 10 shows a schematic plan view of a yaw rate sensor 500 according to a fifth specific embodiment. FIG. 11 shows a section through yaw rate sensor 500 that runs parallel to a y-z plane. In contrast to yaw rate sensor 100 of FIGS. 1 to 3, first movable element 110 of yaw rate sensor 500 has a modified drive frame 520. Drive comb structures 150 of first movable element 110 of yaw rate sensor 500 are disposed on two outer edges of drive frame 520 that run parallel to the y-axis; they are designed to excite first movable element 110 to an oscillation producing a deflection parallel to the x-axis. Drive springs 140 of first movable element 110 are situated in a region of first movable element 110 that is enclosed in box-like fashion by a drive frame 520 and designed such that they allow a movement of first movable element 110 in the x-direction, but are rigid in the y- and z-directions. Second movable element 260 of yaw rate sensor 500 is once again developed symmetrically with respect to first movable element 110 and disposed next to first movable element 110 in the y-direction, above substrate surface 190. In contrast to yaw rate sensor 100 of FIGS. 1 to 3, first detection mass 130 and second detection mass 270 in yaw rate sensor 500 are not connected to substrate surface 190 via external springs 160.

First detection mass 130 and second detection mass 270 have stabilizing cross-ties 295 extending in the x-direction, similar to yaw rate sensor 200 of FIGS. 4 and 5. They may be omitted in alternative embodiments.

First detection mass 130 of first movable element 110, and second detection mass 270 of second movable element 260 are interconnected via a coupling spring 570. Coupling spring 570 differs from coupling spring 170 of FIG. 1 in that it has a specified elasticity in all three spatial directions. For instance, coupling spring 570 may be made up of a multiply folded substrate cross-tie, which has meander-shaped regions having sections that run parallel to the y- and x-axis.

With the aid of drive comb structures 150, first movable element 110 and second movable element 260 of yaw rate sensor 500 may be excited to a coupled drive excitation that produces an anti-parallel deflection of movable elements 110, 260 along the x-axis. In a yaw rate about the x-axis, Coriolis forces are acting on first detection mass 130 and second detection mass 270 and cause anti-parallel deflections of detection masses 130, 270 in the z-direction. The detection of the deflections is carried out as explained with the aid of the previous figures.

Figure 12:
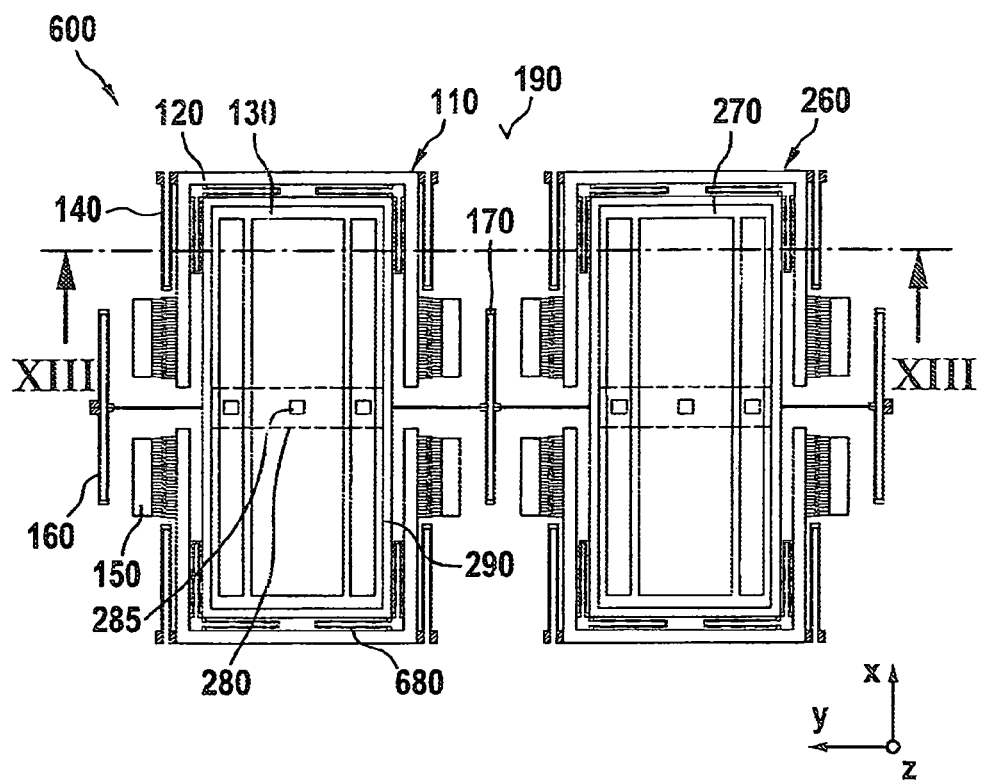
FIG. 12 shows a sixth specific development of a yaw rate sensor.
Figure 13:
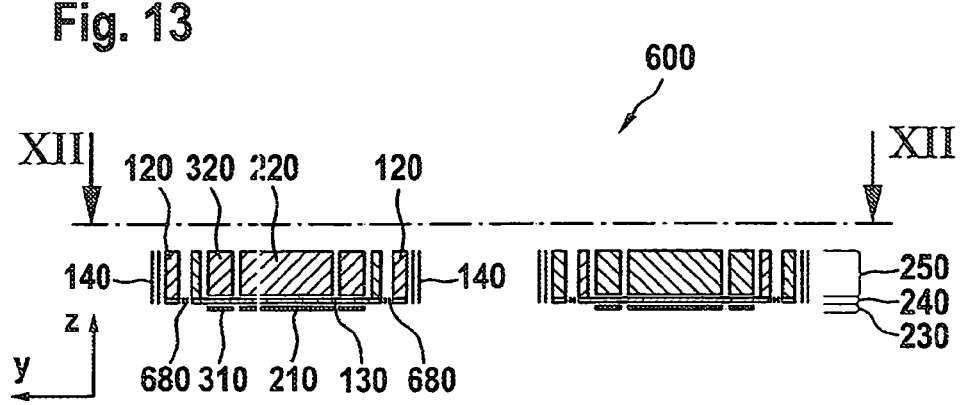
FIG. 13 shows a section through the sixth specific development of the yaw rate sensor.

FIG. 12 shows a plan view of a yaw rate sensor 600 according to a sixth specific embodiment. FIG. 13 shows a section through yaw rate sensor 600 that runs parallel to the y-z plane. Yaw rate sensor 600 of FIG. 12 differs from yaw rate sensor 100 of FIG. 1 in that first detection mass 130 is not connected to drive frame 120 via detection springs 180, but by detection springs 680. As illustrated in FIG. 13, detection springs 680 are implemented only in first functional plane 240. Due to the considerably reduced thickness of first functional plane 240 in comparison with second functional plane 250, detection springs 680 have very low rigidity in the z-direction compared to detection springs 180 of FIGS. 1 to 3. Detection springs 680 may therefore be shorter than detection springs 180 in order to achieve the same rigidity in the z-direction. The result is a considerably higher rigidity of detection springs 680 in the x- and y-directions. This effectively suppresses possible interference modes such as rotation modes of detection mass 130 about the z-axis, and they have an effect only at considerably higher frequencies than in the related art.

Yaw rate sensors 100, 200, 300, 400, 500, 600 may be connected to control and evaluation electronics (not shown here). These electronics generate suitable drive voltages at the drive comb structures and evaluate the capacitance signals of the electrodes in order to determine a yaw rate acting on the yaw rate sensor. The electronics may also carry out the described closed-loop control of the position of the detection masses, the electrostatic positive feedback, or the quadrature compensation.

One skilled in the art may combine the specific embodiments of FIGS. 1 through 13 as desired.

What is claimed is:
1. A yaw rate sensor comprising:
a substrate having a substrate surface,
a first movable element, which is disposed above the substrate surface and includes a drive frame and a first detection mass,
a first electrode, which is disposed at a distance underneath the first detection mass and connected to the substrate surface, and a second electrode, which is disposed at a distance above the first detection mass and connected to the substrate surface, the drive frame being connected to the substrate via at least one drive spring, the detection mass being connected to the drive frame via at least one detection spring, the first movable element being excitable to a drive oscillation parallel to the substrate surface, and the first detection mass being deflectable perpendicular to the substrate surface;

wherein the first movable element has at least one opening, the second electrode being connected to the substrate surface through the opening at an affixation point.

2. The yaw rate sensor as recited in claim 1, wherein a circuit track plane, a first functional plane, and a second functional plane are layered on top of one another, the circuit track plane is connected to the substrate surface, the drive frame is disposed in the first functional plane and in the second functional plane, the first detection mass is disposed at least partially in the first functional plane, the first electrode is situated in the circuit track plane, and the second electrode is situated in the second functional plane.

3. The yaw rate sensor as recited in claim 1, wherein the yaw rate sensor has a second movable element, which includes a second detection mass, the first and the second detection mass being connected to each other via a coupling spring, the first and the second movable element being excitable to a coupled drive oscillation parallel to the substrate surface.

4. The yaw rate sensor as recited in claim 2, wherein the yaw rate sensor has a second movable element, which includes a second detection mass, the first and the second detection mass being connected to each other via a coupling spring, the first and the second movable element being excitable to a coupled drive oscillation parallel to the substrate surface.

5. The yaw rate sensor as recited in claim 3, wherein the first and the second movable element are excitable to a coupled drive oscillation producing an anti-parallel deflection of the first and the second movable element.

6. The yaw rate sensor as recited in claim 4, wherein the first and the second movable element are excitable to a coupled drive oscillation producing an anti-parallel deflection of the first and the second movable element.

7. The yaw rate sensor as recited in claim 2, wherein the first movable element has a stabilizing frame, which is disposed at least partially in the second functional plane.

8. The yaw rate sensor as recited in claim 7, wherein the first movable element has a trough shape with a floor disposed in the first functional plane and an edge, formed by the stabilizing frame, in the first functional plane and the second functional plane.

9. The yaw rate sensor as recited in claim 1, wherein at least one drive comb structure is provided in order to excite the first movable element to the drive oscillation.

10. The yaw rate sensor as recited in claim 1, wherein the first movable element is connected to the substrate surface via at least one external spring.

11. The yaw rate sensor as recited in claim 2, wherein the first functional plane and the second functional plane are made of conductive silicon.

12. The yaw rate sensor as recited in claim 1, wherein at least one further electrode is disposed underneath or above the first detection mass.

13. The yaw rate sensor as recited in claim 12, wherein the at least one further electrode is designed for an electrostatic positive feedback of the first detection mass, for a closed-loop position control of the first detection mass or a quadrature compensation.

14. The yaw rate sensor as recited in claim 1, wherein the yaw rate sensor is connected to an evaluation circuit, which is designed to infer a deflection of the first detection mass perpendicular to the substrate surface from a change in capacitances between the first detection mass and the first and second electrodes, and to infer a yaw rate acting on the yaw rate sensor from the deflection of the first detection mass.

* * * * *

UNITED STATES PATENT AND TRADEMARK OFFICE
CERTIFICATE OF CORRECTION

PATENT NO. : 8,695,425 B2  Page 1 of 1
APPLICATION NO. : 13/138102
DATED : April 15, 2014
INVENTOR(S) : Johannes Classen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 315 days.

Signed and Sealed this

Twenty-ninth Day of September, 2015

Michelle K. Lee
*Director of the United States Patent and Trademark Office*